United States Patent [19]

Jacobson et al.

[11] 4,139,682

[45] Feb. 13, 1979

[54] CELLS HAVING CATHODES DERIVED FROM AMMONIUM-COPPER-MOLYBDENUM-CHALCOGEN COMPOUNDS

[75] Inventors: Allan J. Jacobson, Princeton; M. Stanley Whittingham, Fanwood, both of N.J.

[73] Assignee: Exxon Research & Engineering Co., Florham Park, N.J.

[21] Appl. No.: 910,478

[22] Filed: May 30, 1978

[51] Int. Cl.² .......................................... H01M 4/58
[52] U.S. Cl. .................................................. 429/218
[58] Field of Search ................ 429/218, 103, 191, 194

[56] References Cited

U.S. PATENT DOCUMENTS 4,009,052    2/1977    Whittingham .................. 429/218 X Primary Examiner—Charles F. LeFevour
Attorney, Agent, or Firm—Kenneth P. Glynn

[57] ABSTRACT

The present invention is directed to an electric current-producing cell which contains:
 (a) an anode having as its anode-active material one or more metals selected from the group consisting of the Periodic Table Group IA metals, Group IB metals, Group IIA metals and Group IIB metals;
 (b) a cathode having as its cathode-active material one or more compounds selected from:
  (i) those having the formula:

$$NH_4CuMoZ_y \qquad (1)$$

wherein Z is a chalcogen selected from the group consisting of sulfur, selenium, sulfur-selenium mixtures, sulfur-oxygen mixtures and selenium-oxygen mixtures, and wherein y is a numerical value of about 4.
  (ii) the decomposition products of one or more compounds of subparagraph (i), resulting from the decomposition thereof below about 350° C; and
 (c) an electrolyte which is chemically inert with respect to said anode and said cathode and which permits the migration of ions between said anode and said cathode.

27 Claims, No Drawings

CELLS HAVING CATHODES DERIVED FROM AMMONIUM-COPPER-MOLYBDENUM-CHALCOGEN COMPOUNDS

BACKGROUND OF THE INVENTION

1. Field of the Invention

The present invention relates to electric current-producing cells, and more particularly to such cells employing specified cathode-active materials comprising or derived from ammonium-copper-molybdenum-chalcogenide compounds.

2. Description of the Prior Art

There has been considerable interest in recent years in developing high energy density batteries for voltaic cells. Exemplary of the developing systems is a high energy density electrochemical cell utilizing intercalation compounds of the transition metal chalcogenides as cathode-active materials and using alkali metal anodes, as set forth in U.S. Pat. No. 4,009,052. U.S. Pat. No. 3,915,740 describes a cell having lithium anode-active material and $MoS_x$ (where $2 \leq X \leq 3$) as its cathode-active material, and U.S. Pat. No. 3,864,167 describes some fibrous transition metal trichalcogenides as cathode-active materials. U.S. Pat. No. 3,655,585 describes a cell utilizing as cathode active material vanadium pentoxide, prepared by the thermal decomposition of ammonium vanadate.

U.S. Pat. Nos. 3,898,096, 3,925,098 and 4,003,753 describe electrochemical cells having alkali metal anodes, e.g., lithium, having molten salt electrolytes, and having cathodes containing chalcogenides such as Cu and Fe sulfides, Ni sulfide and oxide and molybdenum sulfide, as well as potassium thiomolybdate $K_2MoS_4$.

The compounds utilized as the cathode active materials in the cells of the present invention are ammonium-copper-molybdenum-chalcogenide type compounds. In this regard, it should be noted that ammonium-metal-chalcogenide compounds are known, as exemplified by U.S. Pat. No. 2,435,380. However, notwithstanding the considerable variety of high energy density electrochemical cell systems which have recently been developed, it is believed that the particular cells of the present invention containing the ammonium-copper-molybdenum-chalcogenides have not been heretofore disclosed or rendered obvious.

SUMMARY OF THE INVENTION

The present invention is directed to an electric current-producing cells which contains:
(a) an anode having as its anode-active material one or more metals selected from the group consisting of the Periodic Table Group IA metals, Group IB metals, Group IIA metals and Group IIB metals;
(b) a cathode having as its cathode-active material one or more compounds selected from:
  (i) those having the formula:

  (1)

wherein Z is a chalcogen selected from the group consisting of sulfur, selenium, sulfur-selenium mixtures, sulfur-oxygen mixtures and selenium-oxygen mixtures, and wherein y is a numerical value of about 4;
  (ii) the decomposition products of one or more compounds of subparagraph (i) resulting from the decomposition thereof below about 350° C.; and
(c) an electrolyte which is chemically inert with respect to said anode and said cathode and which permits the migration of ions between said anode and said cathode.

DETAILED DESCRIPTION OF THE INVENTION

As mentioned, the electric current-producing cell of the present invention is one which contains a specified anode, a functional electrolyte, and a cathode having as its cathode-active material compounds derived from ammonium-copper-molybdenum-chalcogenide compounds.

In general, the anode employed in the cell of the present invention is one which contains as its anode-active material one or more metals selected from the group consisting of the Periodic Table Group IA metals, Group IB metals, Group IIA metals and Group IIB metals. Of these, the Group IA metals, also known as the alkali metals, are desirable. Preferred is the anode having as its anode-active material a metal selected from the group consisting of lithium and sodium, and most preferably lithium. The anode-active material may be in contact with other metal structures in the cell of the present invention, depending upon the particular anode-active material being used. Thus, for example, some anode-active materials are selfsupporting and may also serve as current collectors whereas other anode-active materials, e.g. lithium, may be in contact with other metal structures, such as nickel, copper or silver screen, which serve as current collectors. These anode configurations are a matter of design depending upon the particular anode-active material being used and are well known in the art.

The cathode employed in the cell of the present invention is one which contains as its cathode-active material one or more compounds selected from the group consisting of
(i) those having the formula

  (1)

wherein Z is a chalcogen selected from the group consisting of sulfur, selenium, sulfur-selenium mixtures, sulfur-oxygen mixtures and selenium-oxygen mixtures, and wherein y is a numerical value of about 4;
(ii) the decomposition products of one or more compounds of subparagraph (i) resulting from the decomposition thereof below about 350° C.

The variable Z as defined above represents a chalcogen selected from the group consisting of sulfur, selenium, sulfur-selenium mixtures, sulfur-oxygen mixtures and seleniumoxygen mixtures. Desirably, Z is selected from the group consisting of sulfur and selenium. Preferably, the chalcogen Z is sulfur.

Among the many cathode-active materials which are used in the cells of the present invention are:

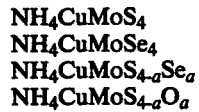

and the like, wherein $4 > a > 0$. Also, as mentioned above, the decomposition products of the foregoing are included.

The above-mentioned cathode-active compounds may be prepared by known techniques and are believed to be within the purview of the artisan. For example, ammonium copper thiomolybdate may be formed by passing sulfurous vapors through a solution of ammonium molybdate and copper sulfate. The decomposition products of ammonium copper thiomolybdate may be obtained at temperatures below about 350° C. by thermal decomposition. Thus, heating ammonium copper thiomolybdate at temperatures about 50° C. or so and up to as high as 350° C. will effect at least to some degree the thermal decomposition of the compound. If the decomposition products of ammonium copper thiomolybdate are obtained at temperatures below about 350° C., a poorly crystalline product is obtained with a sulfur/metal ratio greater than 2.5 but less than 4, whereas heating at higher temperature results in conversion to $Cu_{2-x}S$ and $MoS_2$. The sulfide decomposition products obtained below about 350° C. have surprisingly been found to effect significantly higher energy density electrochemical cells than the products obtained by thermal decomposition above 350° C. or so.

The cathode active materials of the compounds described above which have been decomposed thermally may be characterized by X-ray diffraction.

Advantageously, the cathode active compounds of the present invention cells may simply be cold pressed into a cathode structure. Alternatively, they may be hot pressed (wherein at least partial thermal decomposition is inherent), into a cathode structure, although the thermal decompositions described may be employed prior to cathode construction. The cathode-active material may be supported on structures such as carbon, copper, nickel, stainless steel, iron, etc., and it may be supported on such materials or it may be impregnated into such materials. Advantageously, the cathode need not contain any conductive diluents within the cathode active material, such as carbon. However, plastic binding agents such as polyfluoroethylene may be utilized if desired.

The electrolyte used in the cell of the present invention is any electrolyte which is chemically inert with respect to the anode and with respect to the cathode, and which permits the migration of ions between the anode and the cathode. In general, the choice of electrolyte depends upon the anode-active material being used in the cell. Thus, where the anode-active material is a Group IA metal, the electrolyte will most likely be nonaqueous. However, where the anode-active material is one which is selected, for example, from the Group IIB metals, an aqueous electrolyte may be employed. When the preferred anode-active material selected from the Group IA metals is used in a cell in the present invention, the electrolyte may typically be a nonaqueous alkali metal salt-organic solvent electrolyte solution. These alkali metal salts are well known in the art and need not be enumerated herein. However, such salts include the lithium and sodium salt complexes which are dissolved in organic solvents such as the inertly substituted and unsubstituted ethers, sulfones, organic sulfates, organic sulfites, organic nitrites and organic nitro compounds. One preferred electrolyte for use in conjunction with cells containing lithium as its anode-active material is an electrolyte containing lithium perchlorate salt dissolved in dioxolane or a dioxolane-containing solution. One preferred electrolyte in cells containing sodium as its anode-active material contains sodium triethyl pyrrole boron dissolved in a cyclic ether containing solution. Alternatively, solid electrolytes, such as the beta aluminas or halides, or molten salts, may be used.

The electric current-producing cells of the present invention containing the above-mentioned anodes, cathodes and electrolytes not only have high energy densities, but are also capable of being cycled through charging and discharging, and may be readily produced on a large-scale basis.

The present invention is illustrated by the following examples, but the invention should not be construed as being limited thereto.

EXAMPLE 1

$NH_4CuMoS_4$ was synthesized by passing 15% $H_2S$ in $N_2$ through a solution of 2.0g $CuSO_4 5H_2O$ and 2.8g $MoO_3$ in 25 ml 8% $NH_4OH$ for 4d. The red solid was filtered, washed with 8% $NH_4OH$ solution and ethanol and air dried. The red solid was then treated with hot dilute (0.1M) HCl to remove impurities and subsequently washed with water and ethanol and dried. The BET surface area of the product was 16.4 $m^2$/g. A similar preparation was described by W. P. Binnie, M. J. Redman, and W. J. Mallio in Inorganic Chemistry 9, 1449 1970.

EXAMPLE 2

Solid $NH_4CuMoS_4$, prepared as described in Example 1 was treated with 3 moles of 2.0M n-butyl lithium in hexane per mole of $NH_4CuMoS_4$ in a dry box. The solid turned black and chemical analysis showed that all the n-butyl lithium was consumed. This high reactivity for lithium shows the utility of $NH_4CuMoS_4$ as an active cathode material.

EXAMPLE 3

$NH_4CuMoS_4$ formed as in Example 1 was heated in argon at 10° C./min. to 1000° C. on a thermogravimetric analyzer 8.47% of its initial weight was lost by 260° C. and a further 18.8% was lost beginning at about 350° C. The final reaction products were identified as poorly crystalline $MoS_2$ and $Cu_{2-x}S$.

EXAMPLE 4

$NH_4CuMoS_4$ formed as in Example 1 was mixed with 10.6 wt. % polyethylene and 15 wt. % carbon and pressed into an expanded stainless steel grid first at room temperature and then at 93° C. The grid had about 2 $cm^2$ of active cathode material. A cell was then prepared by surrounding the cathode screen with polypropylene separators and then pure lithium metal which served as the anode. This assembly was then immersed into a 2 molar solution of lithium perchlorate in dioxolane. The cell was then discharged at 1 mA to a cut off of 1.4 volts. The capacity on the first discharge was 0.75 kilo coulombs/g of $NH_4CuMoS_4$ or 2.2 Li/$HN_4CuMoS_4$.

EXAMPLE 5

A cell was constructed as described in Example 4 except that no carbon was added as a conductive diluent. The initial discharge at 1 mA to a cut off of 1.30 volts was similar in cell voltage to that in Example 4 but the capacity was reduced to about 1.0 Li/$NH_4CuMoS_4$. The cell was recharged at 1 mA and subsequently cycled between voltage limits of 1.30 and 2.72 volts. The reversible capacity progressively increased from 0.54 Li on cycle 2 to 1.04 Li on cycle 10 and was then about constant for the next 10 cycles. On cycle 40 the capacity was 0.95 Li and on cycle 60 0.83 Li showing the high reversibility.

EXAMPLE 6

A cell was constructed just as described in Example 5 except that polyfluoroethylene was substituted for polyethylene. Similar electrochemical characteristics were found.

EXAMPLE 7

A cell was constructed as described in Example 4 but using $NH_4CuMoS_4$ which had been heated in a helium stream at 280° C. (i.e. beyond the first weight loss). The grid was pressed at 300° C. The cell was discharged at 1 mA to a cut off of 1.30 volts. The capacity on the first discharge was 1.52 kilo coulombs/g of the decomposition product.

What is claimed is:

1. An electric current-producing cell, comprising:
   (a) an anode having as its anode-active material one or more metals selected from the group consisting of the Periodic Table Group IA metals, Group IB metals, Group IIA metals and Group IIB metals;
   (b) a cathode having as its cathode-active material one or more compounds selected from the group consisting of:
      (i) those having the formula:

$$NH_4CuMoZ_y \qquad (1)$$

wherein Z is a chalcogen selected from the group consisting of sulfur, selenium, sulfur-selenium mixtures, sulfur-oxygen mixtures and selenium-oxygen mixtures, and wherein y is a numerical value of about 4;
      (ii) the thermal decomposition products of one or more compounds of subparagraph (i) resulting from the thermal decomposition thereof from about 50° C. to 350° C.; and,
   (c) an electrolyte which is chemically inert with respect to said anode and said cathode and which permits the migration of ions between said anode and said cathode.

2. The cell of claim 1 wherein Z is a chalcogen selected from the group consisting of sulfur and selenium.

3. The cell of claim 2 wherein said chalcogen Z is sulfur.

4. The cell of claim 1 wherein said anode has as its anode-active material one or more metals selected from the Group IA metals.

5. The cell of claim 4 wherein Z is a chalcogen selected from the group consisting of sulfur and selenium.

6. The cell of claim 5 wherein said chalcogen Z is sulfur.

7. The cell of claim 1 wherein said anode has lithium as its cathode-active material.

8. The cell of claim 7 wherein Z is a chalcogen selected from the group consisting of sulfur and selenium.

9. The cell of claim 8 wherein said chalcogen Z is sulfur.

10. The cell of claim 1 wherein said decomposition is thermal decomposition achieved by hot pressing said cathode-active material into said cell.

11. The cell of claim 10 wherein Z is a chalcogen selected from the group consisting of sulfur and selenium.

12. The cell of claim 11 wherein said chalcogen Z is sulfur.

13. The cell of claim 10 wherein said anode has as its anode-active material one or more metals selected from the Group IA metals.

14. The cell of claim 13 wherein Z is a chalcogen selected from the group consisting of sulfur and selenium.

15. The cell of claim 14 wherein said chalcogen Z is sulfur.

16. The cell of claim 10 wherein said anode has lithium as its cathode-active material.

17. The cell of claim 16 wherein Z is a chalcogen selected from the group consisting of sulfur and selenium.

18. The cell of claim 17 wherein said chalcogen Z is sulfur.

19. The cell of claim 1 wherein said cathode has as its cathode-active material one or more compounds selected from the group consisting of compounds having the formula:

$$NH_4CuMoZ_y \qquad (1)$$

wherein Z and y are as defined.

20. The cell of claim 19 wherein Z is a chalcogen selected from the group consisting of sulfur and selenium.

21. The cell of claim 20 wherein said chalcogen Z is sulfur.

22. The cell of claim 19 wherein said anode has as its anode-active material one or more metals selected from the Group IA metals.

23. The cell of claim 22 wherein Z is a chalcogen selected from the group consisting of sulfur and selenium.

24. The cell of claim 23 wherein said chalcogen Z is sulfur.

25. The cell of claim 19 wherein said anode has lithium as its cathode-active material.

26. The cell of claim 25 wherein Z is a chalcogen selected from the group consisting of sulfur and selenium.

27. The cell of claim 26 wherein said chalcogen Z is sulfur.

* * * * *